Sept. 19, 1967     G. W. HEISELER     3,341,872
TAPING AND SEAM PRESSING MACHINE
Filed Aug. 24, 1965     7 Sheets-Sheet 1
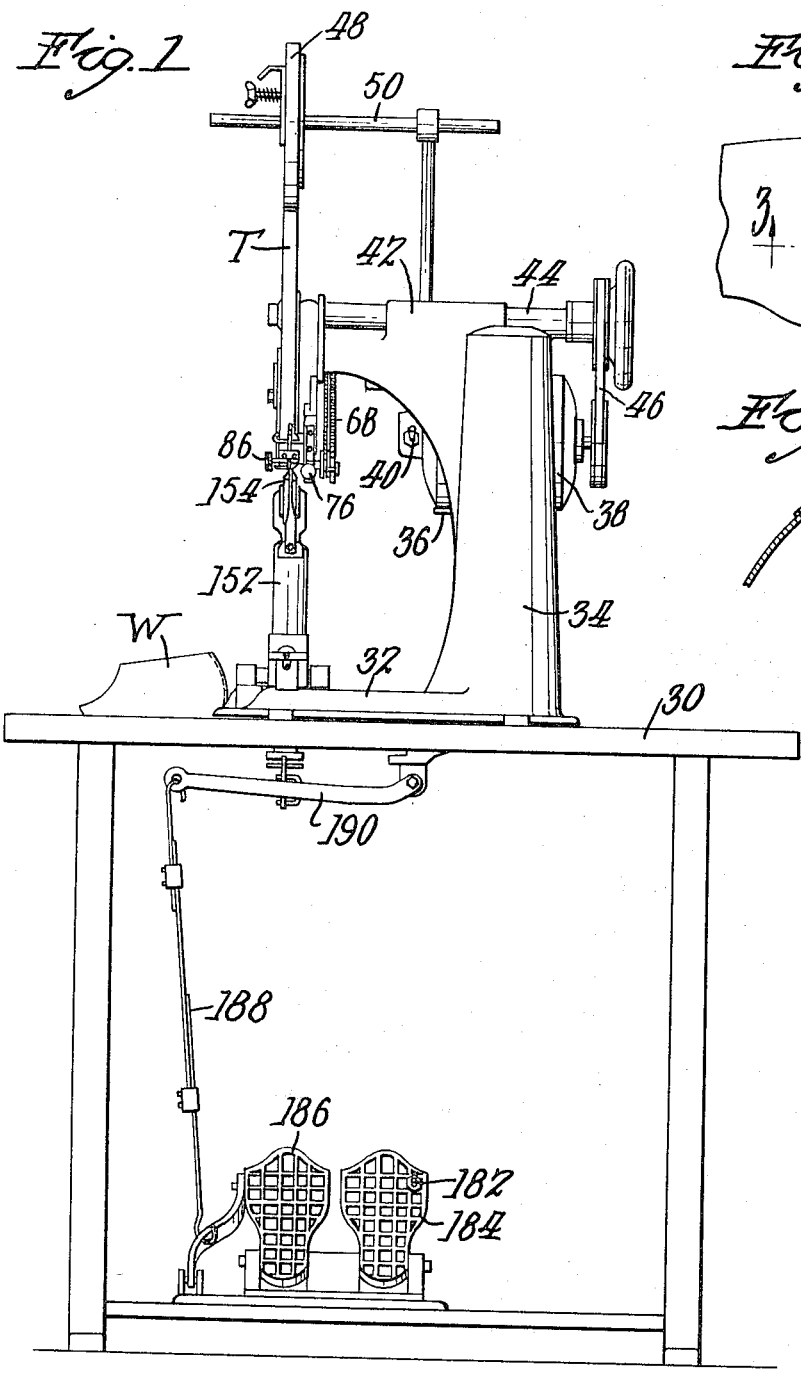
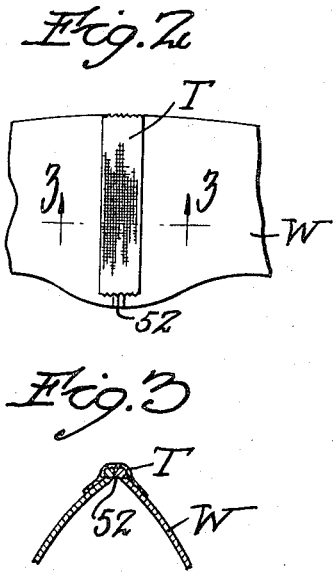
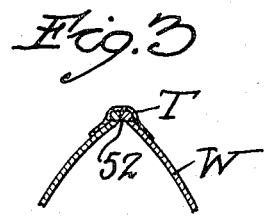
Inventor
George W. Heiseler
By Morse, Altman & Oates
Attorneys

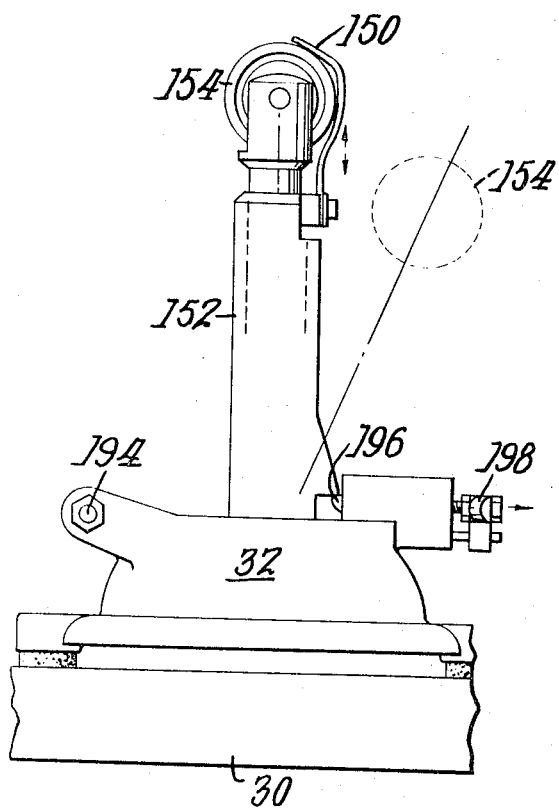
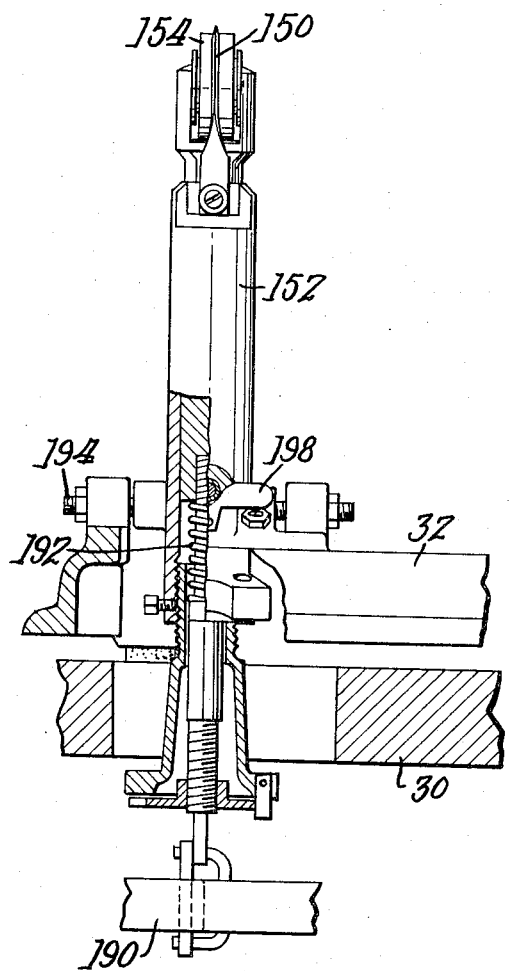

Sept. 19, 1967  G. W. HEISELER  3,341,872
TAPING AND SEAM PRESSING MACHINE
Filed Aug. 24, 1965  7 Sheets-Sheet 4
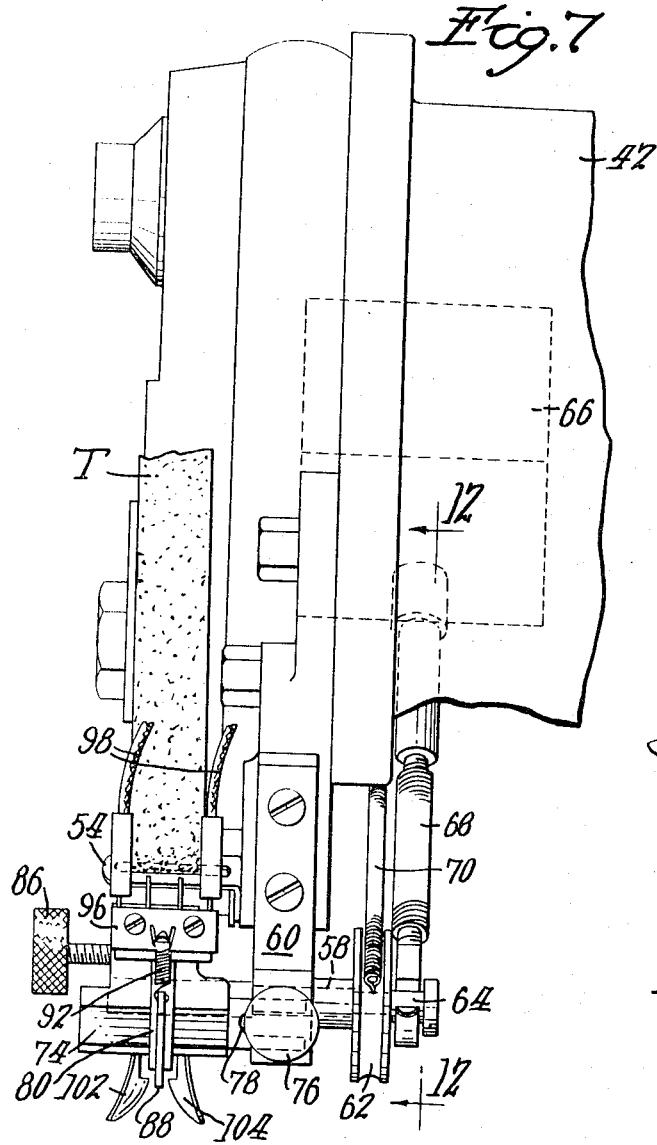
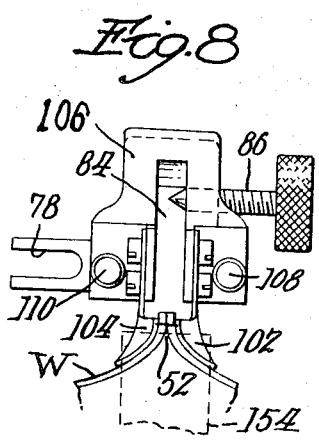
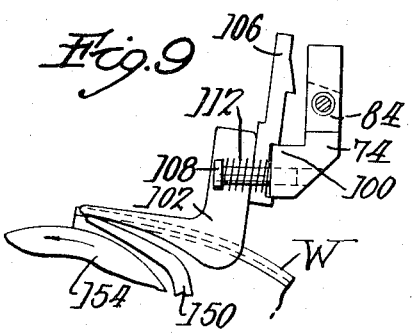
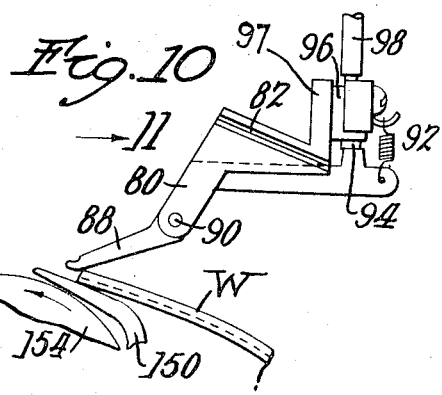
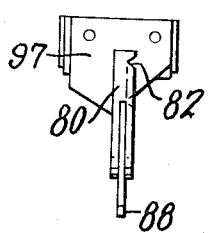

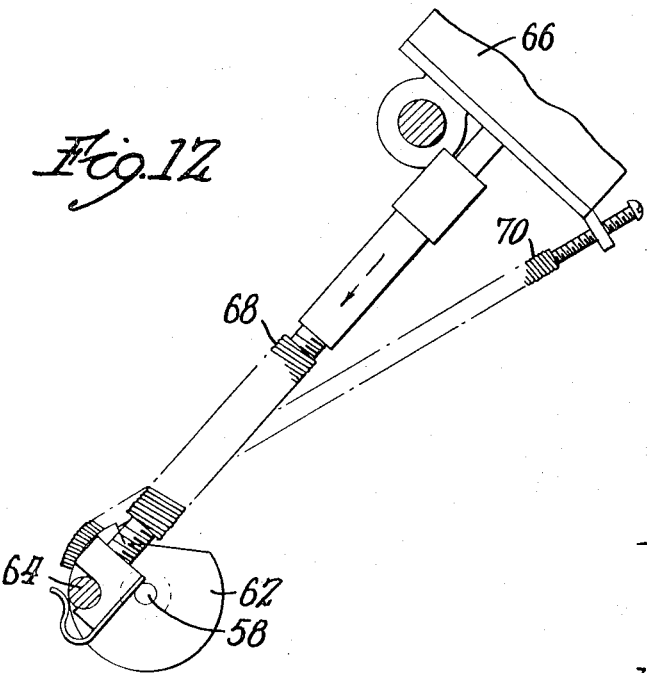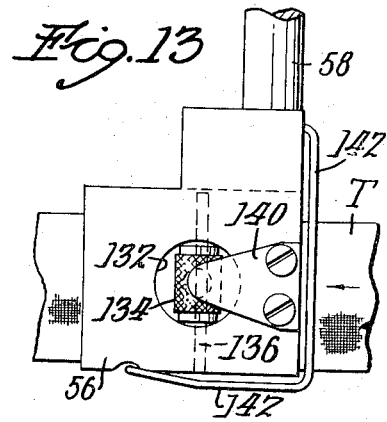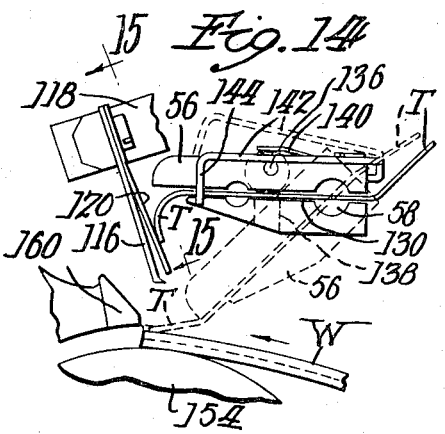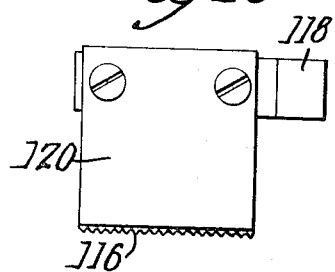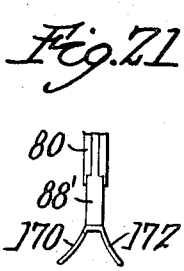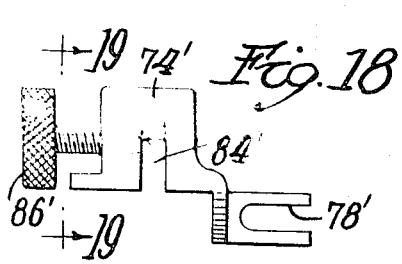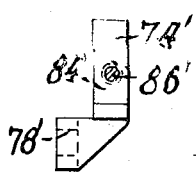

Sept. 19, 1967  G. W. HEISELER  3,341,872
TAPING AND SEAM PRESSING MACHINE
Filed Aug. 24, 1965  7 Sheets-Sheet 7
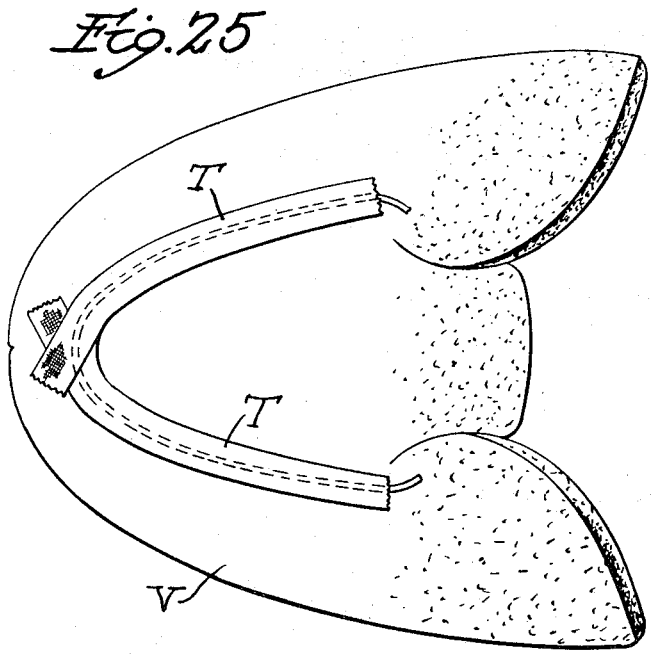
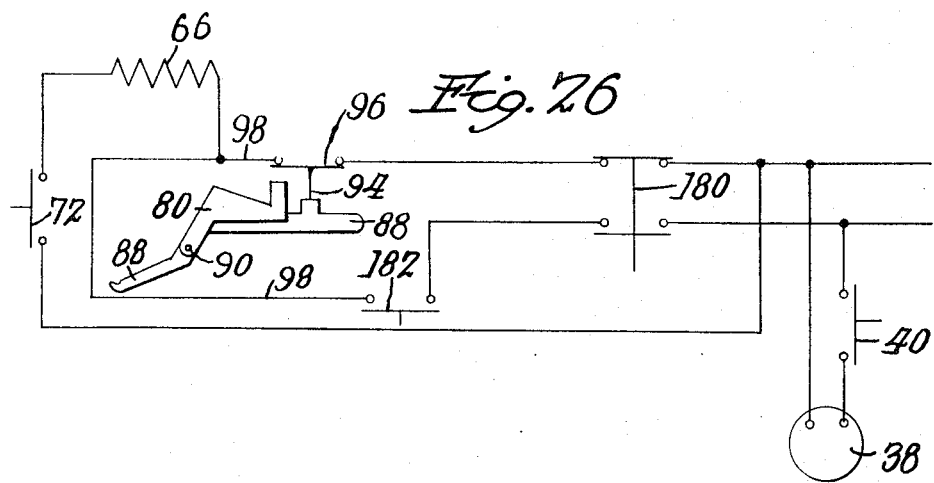

United States Patent Office 3,341,872
Patented Sept. 19, 1967

3,341,872
TAPING AND SEAM PRESSING MACHINE
George W. Heiseler, Saugus, Mass., assignor to Boston Machine Works Company, Lynn, Mass., a corporation of Massachusetts
Filed Aug. 24, 1965, Ser. No. 482,124
6 Claims. (Cl. 12—59.5)

ABSTRACT OF THE DISCLOSURE

A machine for applying adhesive tape to the back seam of a shoe upper has an improved approach guide for the tape consisting of a normally horizontal block with a narrow horizontal slot into which the tape may be introduced through a side of the block. When a workpiece is brought into position for the application of the tape, the approach guide is rocked down so that the end of the tape projecting from the discharge end of the guide is brought into contact with the workpiece. When the desired length of tape has been applied to the work piece, the guide is rocked back to its horizontal position, thus moving the tape against a knife by which it is severed.

---

This invention relates to improvements in a machine for applying tape to cover the seam by which the two quarters of a shoe upper are joined and for pressing the seam to flatten it.

Several machines have been built and patented for this general purpose as, for example, the machine described in U.S. Patent No. 2,211,834, granted Aug. 20, 1940, to Walter P. Osgood. It is an object of the present invention to simplify the structure of machines previously made for applying tape and pressing the back seam of a shoe upper and to improve the construction and operation of several parts of such machine.

For a more complete understanding of the invention, reference may be had to the following description thereof, and to the drawings, of which FIGURE 1 is a front elevation of a machine embodying the invention;

FIGURE 2 is a fragmentary plan view of the quarter portion of a shoe upper to the seam of which a tape has been applied;

FIGURE 3 is a section on the line 3—3 of FIGURE 2;

FIGURE 4 is a side elevation, on a larger scale, of the post carrying the anvil roll and lower seam guide;

FIGURE 5 is a front elevation of the same, parts being broken away to show in section;

FIGURE 7 is a front elevation of most of the mechanism shown in FIGURE 6;

FIGURE 8 is a rear elevation, on a larger scale, of the actuator block and upper seam guide;

FIGURE 9 is a side elevation of the upper and lower seam guides;

FIGURE 10 is a side elevation of the actuator to be mounted in the block shown in FIGURE 8, but on a larger scale;

FIGURE 11 is a rear elevation of the actuator shown in FIGURE 10;

FIGURE 12 is a side elevation of the linkage shown in FIGURE 7 connecting the solenoid to the crank for rocking the approach guide;

FIGURE 13 is an enlarged plan view of the approach guide;

FIGURE 14 is a side elevation of the approach guide shown in FIGURE 13, and adjacent parts, just after the tape has been cut;

FIGURE 15 is an elevation of a knife and spring viewed as indicated by the line 15—15 of FIGURE 14;

FIGURE 16 is a side elevation of the approach guide and knife as the tape is about to be cut;

FIGURE 17 is a section on the line 17—17 of FIGURE 16;

FIGURE 18 is a front elevation of an upper seam guide bracket for the modified form of actuator shown in FIGURE 20;

FIGURE 19 is a side elevation of the upper seam guide bracket shown in FIGURE 18;

FIGURE 20 is a side elevation of a modified form of actuator and upper seam guide, and part of a switch bracket;

FIGURE 21 is a rear elevation of the actuator and guide shown in FIGURE 20;

FIGURE 25 is a plan view of a taped vamp piece; and

FIGURE 26 is a wiring diagram of the electrical portion of the apparatus.

Figure 6:
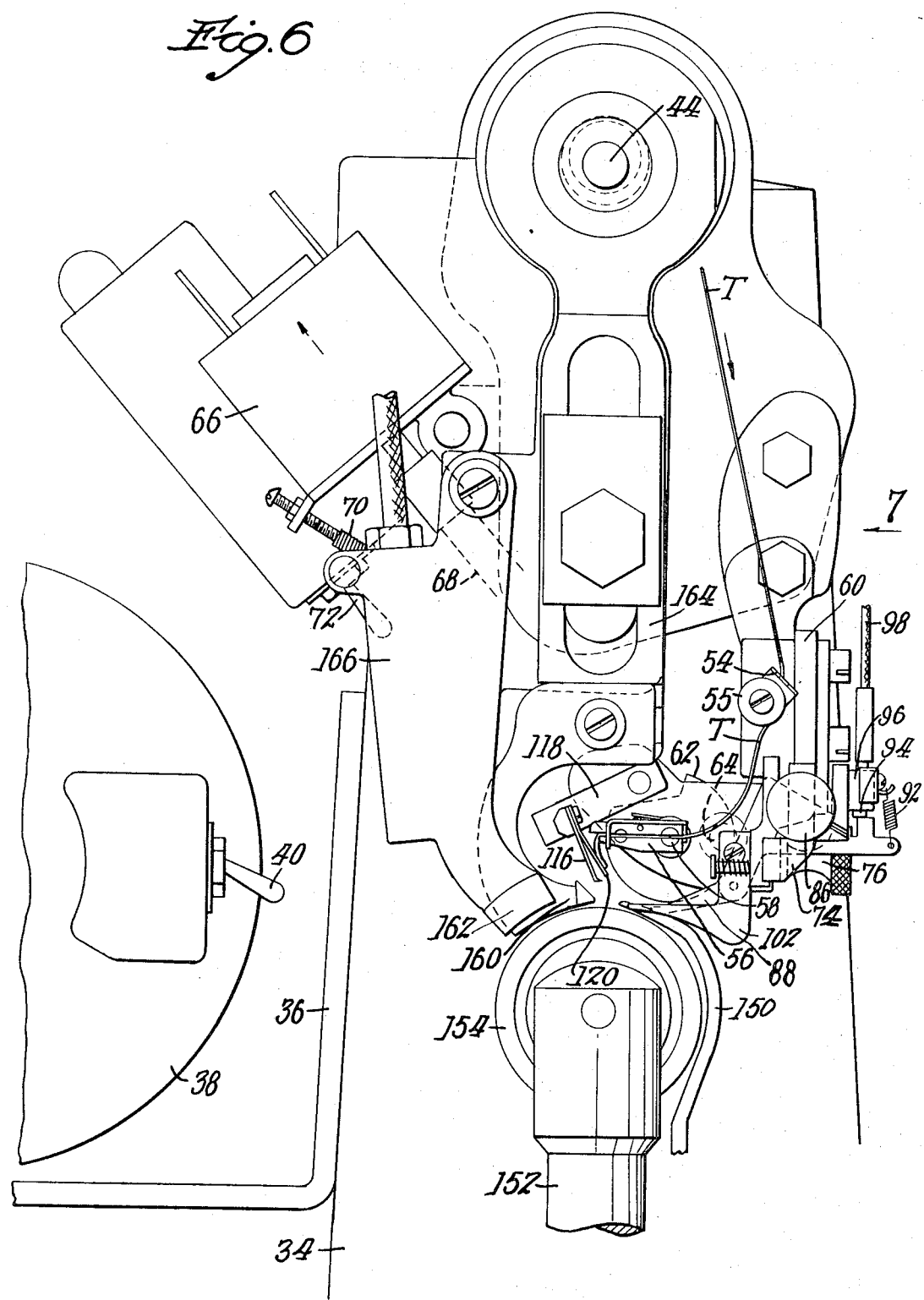
FIGURE 6 is a side elevation, on a larger scale, of the tape-applying and seam-pressing mechanism.

A bench-type tape-applying and seam-pressing machine embodying the present invention is shown in FIGURE 1 of the drawings. The machine is mounted on a table 30 and has a frame which includes a base 32 with a column 34 thereon. On the rear side of the column 34 is mounted a bracket 36 which carries an electric motor 38 for driving the tape-applying mechanism. A manual switch 40 is provided for starting and stopping the motor 38. Integral with the column 34 is a heavy bracket 42 which projects over the base 32 and has bearings for a horizontal shaft 44 which is operatively connected to the motor 38 by conventional means such as a belt 46.

The tape T which is applied by the machine is supplied from a roll 48 carried above the machine on a suitable bracket 50. The tape is coated on one side with a sticky adhesive substance so that when it is applied to the back seam 52 of a shoe upper (FIGURE 3) it will adhere thereto. As the tape T is drawn from the roll 48, it passes down through a slot in a guide member 54 (FIGURE 6) and over a flanged guide roll 55 to an approach guide 56 which is carried by a short rock shaft 58 journalled in a bracket 60. Also mounted on the shaft 58 is a crank disc 62 with a crank pin 64 (FIGURE 12). The crank disk is operatively connected to a solenoid 66 by a link 68 in the form of a tight wound spring the length of which is adjustable. When the solenoid 66 is energized, it thrusts the link 68 downward, rocking the disk 62 and shaft 58 counter-clockwise (clockwise in FIGURES 14 and 16) against the tension of a spring 70 which rocks the disk clockwise (FIGURE 12) when the solenoid is de-energized. A toggle switch 72 (FIGURE 6) is provided to disconnect the solenoid from the power source when the machine is not being used. When the machine is made ready for use the solenoid switch is closed and the solenoid is energized, the resulting position of the parts moved by energization of the solenoid being as shown in FIGURES 6, 12, 14 and 16. The approach guide 56 is then in a substantially horizontal position. When a workpiece is moved into position for application of the tape thereto, as hereinafter described, it deenergizes the solenoid 66 with the result that the approach guide rocks down to the position shown in broken lines in FIGURE 14.

Removably mounted on the bracket 60 is an actuator bracket 74 which is secured to the bracket 60 by a screw 76 which passes through a notch 78 (FIGURES 7 and 8) in the actuator bracket. Adjustably secured to the actuator bracket 74 is an actuator block 80 having a groove 82 in one side surface. The upper part of the block 80 fits into a channel 84 in the actuator bracket 74 and is secured in place by a screw 86 which enters the groove 82. The lower portion of the actuator block 80 is bifurcated to receive the actuator 88 which is pivoted to the actuator block at 90. As indicated in FIGURE 10, the actuator is an elongated zig-zag member the lower end of which is a feeler which bears on the workpiece W when the latter is being taped. The upper end of the actuator is pulled upward by a spring 92 to press against the plunger 94 of a switch 96 which is mounted on the front face of a plate 97 integral with the actuator block 80, and which usually controls the solenoid 66, being connected therewith by wires 98.

The lower portion of the actuator bracket 74 is bifurcated by the groove 84 and projects to the rear as at 100 (FIGURES 8 and 9). An upper seam guide comprising two wings 102, 104 secured to the legs of a carrier piece 106 in the form of an inverted U is attached to the rear of the actuator bracket. Two headed screws 108, 110 project from the bracket 74 through the respective legs of the carrier piece 106. Surrounding each of these screws is a spring 112 compressed between the head of the screw and the leg of the carrier piece 106. These springs hold the upper seam guide wings 102, 104 in place but permit them to yield to accommodate different thicknesses of workpieces. The guide wings themselves are of stiffly resilient sheet steel so that they can yield laterally if a seam of extra width comes between them. When a workpiece W is introduced between the wings 102, 104 of the upper seam guide, the actuator 88 is rocked by the workpiece to open the solenoid switch 96, deenergizing the solenoid so that the spring 70 rocks the approach guide 56 to the lowered position indicated by broken lines in FIGURE 14. This brings the leading end of the tape T into contact with the workpiece W. The leading end of each workpiece trips the actuator 88 at the same point of its progress past the upper seam guide. Ordinarily it is desirable that the leading end of the tape be applied flush with the leading end of the seam 52, but if it is desired that the leading end of the tape be beyond or short of the end of the seam, this result can be had by changing the length of the link 68 which can readily be adjusted. Such adjustment results in a change in the angle to which the approach guide 56 is rocked and a consequent change in the point on the workpiece to which the leading end of the tape is applied.

The trailing end of the piece of tape applied to the workpiece is determined by energization of the solenoid 66 when the workpiece moves from under the actuator 88 permitting the spring 92 to rock the actuator so as to close the switch 96. The solenoid rocks the approach guide 56 up to the horizontal position indicated in FIGURES 14 and 16, bringing the tape against the teeth of a fixed knife 116 carried by an arm 118 secured to the bracket 60. A leaf spring 120 is mounted with the knife 116 and normally inclines away from the knife as indicated in FIGURE 14. When the tape is drawn taut against the teeth of the knife as indicated in FIGURE 16, the spring 120 is pressed by the tape against the face of the knife so that when the tape is severed the spring pushes the new leading end of the tape clear of the teeth of the knife. This operation is effective for the ordinary type of tacky tape, but for exceptionally sticky tape such as is sometimes employed, additional means may be desirable for clearing the newly cut end of the tape from the knife.

Figure 22:
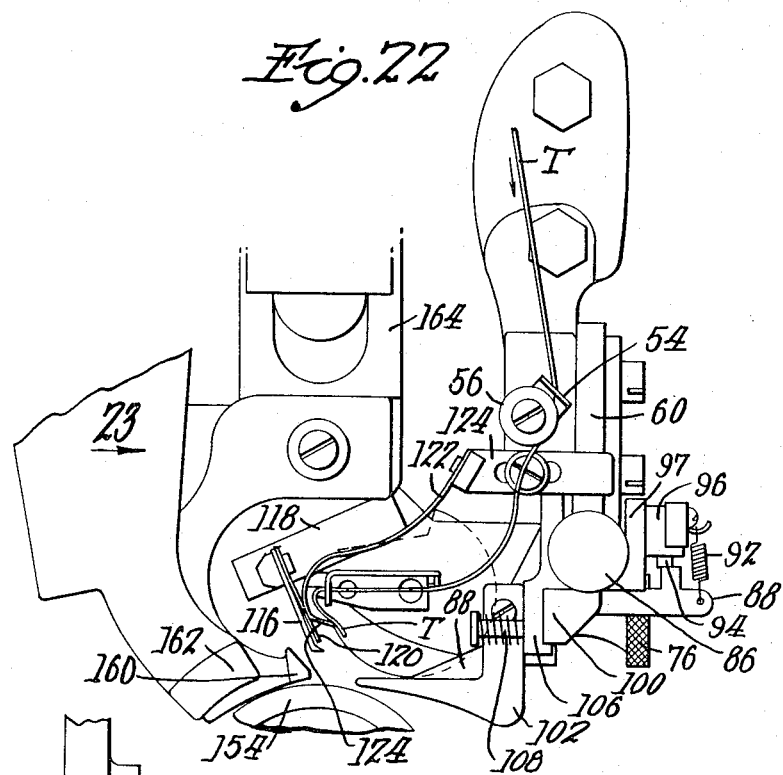
FIGURE 22 is a side elevation of some of the mechanism shown in FIGURE 6, together with a tape release spring.
Figure 23:
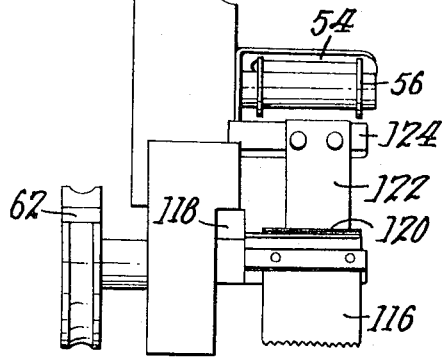
FIGURE 23 is a rear elevation of the stationary knife and tape release spring shown in FIGURE 22.
Figure 24:
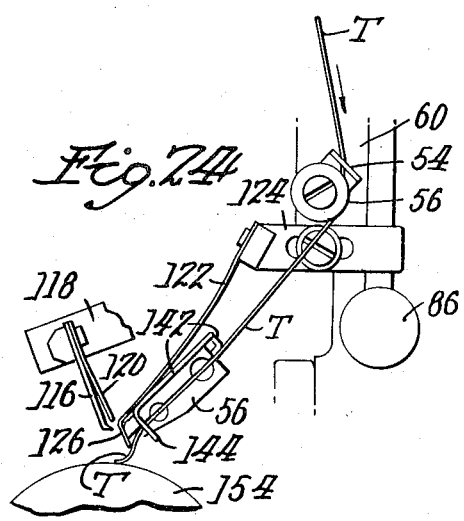
FIGURE 24 is a side elevation of the parts shown in FIGURE 23.

For this purpose a second leaf spring 122 may be employed, as illustrated in FIGURES 22, 23 and 24. This elongated spring may be supported by an arm 124 to which one end of the spring is secured, the arm being attached to the bracket 60. The spring 122 extends from the arm 124, which is above and forward of the approach guide 56, down between the approach guide and the knife, the free end portion 126 of the spring 122 being bent back around the end of the approach guide, as indicated in FIGURES 22 and 24. When the approach guide 56 is swung upward at the termination of a tape-applying operation to bring the tape into severing relation to the knife 116, the newly cut end of the tape is pushed well clear of the knife by the bent end 126 of the auxiliary spring 122, as indicated in FIGURE 22.

The approach guide 56 is constructed to act as an effective one-way clutch to prevent any retrograde movement of the tape therein after the tape has been cut. The principal portion of the approach guide is a flat square block having a thin cut or slot 130 extending in from a side thereof and from front to rear, the dimensions of the slot being sufficient to accommodate the tape T which can be inserted laterally. An opening 132 is made from the top of the block to the cut 130 of sufficient size to receive a small knurled roll 134 which is eccentrically mounted on shaft 136. Beneath the roll 134 a hole 138 comes up through the bottom of the block. The tape T passes under the roll 134 readily when moving in the feeding direction, but if reverse tension is put on the tape, the roll is slightly rocked on its eccentric axis to press the tape down on the orifice of the hole 138, effectively pinching it against an edge of the orifice and preventing any retrograde movement of the tape. A small leaf spring 140 is mounted on top of the block to bear on the roll 134 and ensure its effective pinching action. To prevent sidewise movement of the tape as it is passing through the approach guide, a spring wire 142 is mounted at one end on the block to extend around the front end and a side of the block, this wire having an end portion 144 bent down to cross the side of the cut 130 as indicated in FIGURE 14. To thread the tape T through the approach guide, the wire guide 142 is sprung up to the position indicated in broken lines in FIGURE 14, whereupon the tape is inserted sidewise into the cut 130.

When a workpiece is to be operated on, the leading end of the seam 52 is pushed in between the upper seam guide 102, 104 and a lower seam guide 150 which is mounted on a post 152 near the periphery of an anvil wheel 154 which is also carried by the post 152. The seam picks up the end of the tape T which projects from the approach guide 56, as indicated in FIGURE 14, and at once comes under the walking hammers or pressures 160, 162 which operate, as described in said U.S. Patent No. 2,211,834, to press strongly on the seam and the marginal portions of the tape which is being applied to the seam. These hammers strike alternately with oscillating movements which not only press strongly on the workpiece but also impart feeding movement thereto so that the workpiece passes rapidly through the machine and the seam is flattened. The hammer 160 is carried by a head 164, and the flanking hammers 162 are carried by a head 166, both heads being operatively connected to eccentrics mounted on the shaft 44.

For use on seams joining pieces of relatively heavy leather for uppers, a modified form of upper seam guide may be employed as illustrated in FIGURES 18–21. In this form the wings 170, 172 of the upper seam guide are made integral with the actuator 88' so that when the upper seam guide rides off the trailing edge of the workpiece or the quarter lining, if there is one, the switch plunger 94 is actuated to energize the solenoid 66 and rock the approach guide 56 up to sever the tape. The actuator 88' is rockably carried by an actuator block 80 having a V-groove 82 in a side thereof. The upper portion of the block 82 fits in a channel 84' in a bracket 74' and is adjustably secured therein by a set screw 86' having a pointed end which engages in the V-groove 82 of the block 80 to hold the block in adjusted position on the bracket. The bracket 74' is secured to the approach guide bracket 60 by a screw 76 in the manner indicated in FIGURE 7, this screw passing through a notch 78' (FIGURE 18).

The mechanisms hereinbefore described are designed for the application of tape to the back seams of shoe uppers, the mechanisms being adjustable to determine automatically the location of the leading end of the tape relative to the leading end of the back seam, and the location of the trailing end of the tape relative to the trailing end of the back seam. The machine, however, can be used for the application of tape to other shoe parts such as a vamp piece V shown in FIGURE 25. For such application of tape, the start and finish of the tape must be controlled by the operator. For this purpose a double-throw switch 180 is provided (FIGURE 26), manually operable to disconnect the automatic control switch 94 and connect a foot-operated switch 182 in series with the solenoid. For convenience the switch 182 may be mounted on a treadle 184 under the table 30. To get the workpiece V under the hammers without premature feeding action, the post 152 which carries the anvil wheel 154 is lowered by actuation of a treadle 186 which acts through a linkage 188 and a level 190 to draw the post down against the restoring force of a spring 192. When the workpiece V is in place on the anvil wheel, ready for the application of tape thereto, the normally closed foot-switch 182 is opened by the operator so that the spring 70 can rock the shaft 58 and approach guide 56 to apply the leading end of the tape to the workpiece. The treadle 186 is then rocked by the operator to elevate the anvil roll 154 so that the workpiece is pressed against the walking hammers 160 and 162 which feed it along and press the tape thereon until the foot switch 182 is closed by the operator, causing the solenoid 66 to cause the tape to be severed by the knife 116.

The post 152 is rockable forward about a pivot 194 to permit the removal of uppers in the form of closed loops which have been operated on. A latch 196 holds the post in its upright position and may be retracted by a handle 198 to permit the post to be swung forward.

The wiring diagram in FIGURE 26 shows the circuits as they are when the machine is not in use. To make it ready for operation, the switches 40 and 72 are manually closed. This starts the motor 38 and energizes the solenoid 66. When a workpiece W passes under the feeler end of the actuator 88, the switch 96 is opened. This deenergizes the solenoid until the workpiece passes from under the feeler.

If the switch 180 is thrown to its other position, the solenoid is thereupon controlled by the switch 182 instead of the switch 96.

I claim:

1. In a tape-applying machine comprising a frame, an anvil mounted on said frame, a knife carried by said frame above said anvil, a tape-guide mounted on said frame and rockable between a position in which the tape guided thereby is brought to proximity to said anvil and a position in which the tape is lifted into severing relation to said knife, a solenoid, connecting means operable by energization of said solenoid to rock said guide to one of said positions, and spring means for returning said guide to the other position when the solenoid is deenergized; control means for said solenoid including a switch with an element movable for opening and closing the switch, an actuator pivotally mounted on said frame, said actuator having one end near said anvil in a position to be rocked by a workpiece brought to the anvil, spring means for reversely rocking said actuator when the workpiece passes from under the actuator, said switch element being engaged by said actuator at another point thereof to be opened and closed by rocking movement of the actuator, and power-driven means for pressing the tape on the workpiece and feeding the tape and workpiece on the anvil, said connecting means including a link the length of which is adjustable to vary the point at which the leading end of the tape is applied to a workpiece advancing on the anvil.

2. Mechanism as described in claim 1, said tape-guide being rocked upward by energization of said solenoid and downward by the first said spring.

3. Mechanism as described in claim 1, and means for adjusting said actuator toward and from said knife whereby to regulate the point at which the tape is severed.

4. Mechanism as described in claim 1, said tape-guide comprising a block with a narrow slot extending from end to end thereof and in from a side thereof whereby a tape may be introduced laterally into the guide, said block having an aperture through the top thereof communicating with said slot, a knurled roll in said aperture mounted on an eccentric axis and arranged to bear on a tape in said slot to prevent retrograde movement of the tape in the guide.

5. Mechanism as described in claim 4, said block having a hole directly under said roll to cooperate with the roll in preventing retrograde movement of the tape in the guide.

6. Mechanism as described in claim 1, foot-operable means for depressing said anvil for introduction of a workpiece between said anvil and said pressing means, a foot-operable switch for controlling said solenoid, and means for disconnecting the actuator-operated switch from the solenoid and connecting the foot-operated switch with the solenoid.

References Cited

UNITED STATES PATENTS

| 2,223,209 | 11/1940 | Groh et al. | 12—59.5 |
| 2,736,047 | 2/1956 | Roske | 12—59.5 |
| 2,755,492 | 7/1956 | Vachon | 12—59.5 |
| 2,871,493 | 2/1959 | Vachon | 12—59.5 |
| 3,012,261 | 10/1961 | Small | 12—59.5 |

PATRICK D. LAWSON, *Primary Examiner.*